(No Model.)
J. W. BISHOP.
Automatic Fire Extinguisher.
No. 239,217.  Patented March 22, 1881.
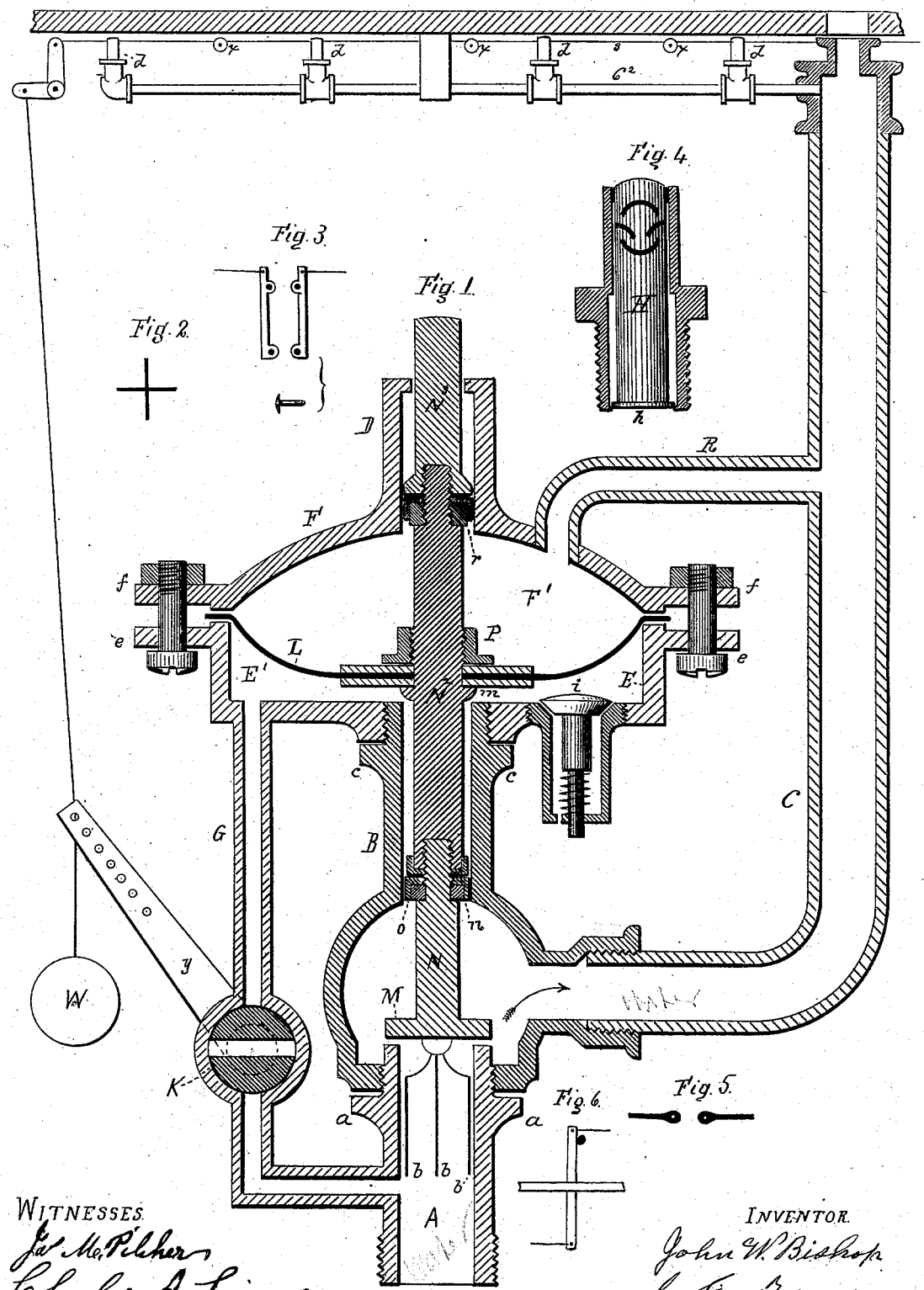
Witnesses
Jas. M. Pilcher
Charles A. Lines
Inventor
John W. Bishop
by Geo. Berry, Atty

UNITED STATES PATENT OFFICE.

JOHN W. BISHOP, OF NEW HAVEN, CONNECTICUT.

AUTOMATIC FIRE-EXTINGUISHER.

SPECIFICATION forming part of Letters Patent No. 239,217, dated March 22, 1881.

Application filed January 18, 1881. (No model.)

*To all whom it may concern:*

Be it known that I, JOHN W. BISHOP, of New Haven, in the county of New Haven and State of Connecticut, have invented a new, useful, and Improved Automatic Fire-Extinguisher, of which the following is a description.

My extinguisher belongs to that class which are provided with means for excluding the water from the building until it is needed, and thus secure the building from any damage which might occur from the leakage of any of its parts, and for automatically letting it into the pipes within the building in case of fire, to extinguish the same.

The invention consists in a novel distributer, and in novel combinations and devices, as they are hereinafter more fully set forth and claimed.

In the accompanying drawings, Figure 1 is a vertical section of the extinguisher; Fig. 2, a cross-section of one of its parts; Fig. 3, a view of a connecting-link; Fig. 4, a view of the distributer; Fig. 5, a view of the perforated and flattened ends of the connecting-wires; and Fig. 6, a view of a connecting-link.

To enable others to make my extinguisher so that it will operate in the manner contemplated, I will describe it in detail.

A is a pipe, which is connected to a pipe leading to a main in the street or to the source of water-supply. It has the shoulders $a$, and in it the fins $b$ (shown in Fig. 1, and in cross-section in Fig. 2) move to steady the valve M and its stem.

The pipe B has the shoulders $c$, and has its lower end enlarged into a form nearly spherical, as shown, and is screwed to the pipe A.

C is the main pipe in the building, into which the smaller pipes on which the distributers are arranged are inserted, and connects with the enlarged part of the pipe B.

E is a large cylindrical vessel. It has the flange $e$, and is screwed to the pipe B. It is connected to the pipe A by the pipe G, in which is the cock K, operated by the arm $y$, on which is the weight W. The pipe G may be connected to the pipe C, and its operation would be the same. It has the valve $i$, on the stem of which is a light spiral spring of sufficient strength to keep the valve open when there is no water-pressure upon it. The function of this valve is to let water out of the vessel E in case of leakage. A like valve may be arranged in the pipe C, above the point to which the water rises to close the diaphragm or valve M.

F is a dome-shaped piece, of the same diameter as the vessel E, and has the flange $f$, of the same size as the flange $e$. Through these flanges bolts into threaded nuts pass to hold the flanges together. From the central part of the dome-shaped piece F the pipe D extends.

L is an elastic diaphragm, held between the vessel E and piece F, as shown, through which the stem passes, and divides the chamber formed by the vessel E and piece F into two parts or chambers.

The valve M closes the pipe A, the end of the pipe being the valve-seat. To the valve are attached the fins $b$, before mentioned. The stem N of the valve has a shoulder, on which the collar $n$ rests, and is packed in the pipe B by the packing $o$, its upper end being threaded. The stem $N^2$ is screwed on the upper end of the stem N, and has its lower end packed, as shown. It also has the shoulder or enlargement $m$, on which a plate rests, between which and another plate of the same size the diaphragm L is held by the nut P. Its upper end is threaded and has the collar $r$, which is packed in the pipe D. The stem $N^3$ is screwed onto the upper end of stem $N^2$, and projects above the pipe D. To its upper end a fire-alarm may be attached.

The pipe R connects the dome-shaped piece F with the pipe C.

The pipe $C^2$ is connected with the pipe C, and on it, or on fittings connecting its parts, the distributers $d$ are arranged.

The wire $s$ is connected by joints $x$, made by a bolt (shown in Fig. 3) of "fusible metal," as alloys which melt at a low temperature are called, passing through holes made in the flattened ends of wire, as shown in Fig. 5.

The distributer H, Fig. 4, is a hollow cylinder or tube fitted loosely in the end of the conduit-pipe, has the enlargement $h$ on its lower end, suitable perforations in its upper part, its upper end being closed. Its upper part is soldered by fusible metal to the inside of the conduit-pipe, near its end, as shown. Instead of solder on the inside of the conduit-pipe, a circular piece of sheet metal may be soldered to the end of the conduit-pipe to hold the distributer in place. In the end of the conduit-pipe (shown in section in Fig. 4) there are two shoulders, which limit the motion of the distributer by means of the enlargement on its lower end. Pins may be substituted for the lower shoulder.

The connecting-link, Fig. 3, consists of two strips or bars of metal, hinged at their lower ends by an iron bolt passing through holes in the bars, or in any other suitable way, the upper ends of the pieces being held together by a bolt of fusible metal passing through holes in the upper parts, or the upper parts may be soldered together. The bolt or solder being melted, the connecting-wire is lengthened by the length of both pieces, and the connection is unbroken. In Fig. 6 a modification of the connecting-link is shown, consisting of an upright bar soldered to a horizontal bar by fusible metal, which being melted the connecting-wire is lengthened by the length of the bar, the connection being unbroken, as before. This bar may be pivoted in the middle, and a pin of fusible metal may be inserted in the wall to keep it from turning, as shown.

My extinguisher being constructed as described, the water coming against the valve M opens it and flows through the pipes C and R into the chamber F', fills the chamber, and rises in the pipe C until the water-pressure on the diaphragm closes the valve. To be more explicit, if the area of the valve is a square inch and the water-pressure upon it is forty pounds to the square inch, and if the area of the diaphragm is forty square inches, the water will fill the chamber F' and rise in the pipe C until the water-pressure on the diaphragm is more than a pound to the square inch, when the water-pressure on the diaphragm will exceed the water-pressure on the valve and close it. To make a pressure of a pound to the square inch on the diaphragm, the water in the pipe C must rise about twenty-six inches above the diaphragm. When the distributer is liberated by heat, and when any one of the fusible joints in the wire $s$ is melted, the arm $y$ descends and opens the cock K, and the water flows through the pipe G into the chamber E', and creates a water-pressure on the under side of the diaphragm equal to the water-pressure on its upper side, and the water then flows through the pipe C in the same manner as though the devices for excluding the water from the building formed no part of the extinguisher.

Having described my improved extinguisher and its mode of operation, what I claim as new, and desire to secure by Letters Patent, is—

1. The pipes A, C, and R, in combination with the dome-shaped piece F, fastened to the vessel E, diaphragm L, held between the parts E and F and between plates screwed to the shoulder $m$ by the nut P, stem $N^2$, stem N, and valve M, substantially as shown and set forth.

2. The pipes A and G, the pipe G, having the cock K, operated by the arm $y$, in combination with the vessel E, diaphragm L, held between the parts E and F and between plates screwed to the shoulder $m$ by the nut P, weight W, attached to the arm $y$, and connecting-wire $s$, having either one or more joints of fusible metal, substantially as shown and set forth.

3. In an automatic fire-extinguisher, the vessel E F and flexible diaphragm L, which divides said vessel into upper and lower compartments, in combination with induction-ports communicating with said compartments, whereby a downward pressure is exerted on the upper side of the diaphragm L and an upward pressure on the under side of the diaphragm L by water introduced into the vessel E F through ports communicating with the source of water-supply, substantially as shown and set forth.

4. The distributer consisting of the tube H, having a closed upper end, and provided with an enlargement or rim, $h$, at its lower end, and with perforations near its upper end, in combination with the conduit-pipe and a fusible joint adapted to secure the distributer within said conduit-pipe, substantially as described.

5. In an automatic fire-extinguisher, the valve $i$, having a spiral spring upon its stem, in combination with the valve-seat and the vessel E F, provided with a flexible diaphragm, L, whereby a drip-opening is provided which is effectually closed upon the admission of water through pipe G below said diaphragm, substantially in manner set forth.

6. In an automatic fire-extinguisher, a connecting-link composed of two strips or bars of metal permanently hinged together at one point and adapted to be secured together at another point by easily-fusible metal or solder, substantially as set forth.

7. In an automatic fire-extinguisher, a joint composed of two connecting-links held together by a bolt of fusible metal, substantially as set forth.

JOHN W. BISHOP.

Witnesses:
GEORGE TERRY,
CHARLES A. LINES.